United States Patent
Zhou et al.

(10) Patent No.: US 9,083,034 B2
(45) Date of Patent: Jul. 14, 2015

(54) TREATED BATTERY SEPARATOR

(71) Applicant: Ford Global Technologies, LLC, Dearborn, MI (US)

(72) Inventors: Qian Zhou, Northville, MI (US); Kent Snyder, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 13/834,060

(22) Filed: Mar. 15, 2013

(65) Prior Publication Data
US 2014/0272557 A1 Sep. 18, 2014

(51) Int. Cl.
  *H01M 2/14* (2006.01)
  *H01M 2/16* (2006.01)
  *H01M 10/0525* (2010.01)

(52) U.S. Cl.
  CPC ............ *H01M 2/145* (2013.01); *H01M 2/1653* (2013.01); *H01M 10/0525* (2013.01); *H01M 2220/20* (2013.01); *Y02E 60/122* (2013.01)

(58) Field of Classification Search
  None
  See application file for complete search history.

(56) References Cited

U.S. PATENT DOCUMENTS

| | | | |
|---|---|---|---|
| 4,731,311 A * | 3/1988 | Suzuki et al. | 429/213 |
| 6,153,701 A | 11/2000 | Potnis et al. | |
| 6,348,286 B1 | 2/2002 | Tanaka et al. | |
| 6,811,911 B1 | 11/2004 | Peled et al. | |
| 7,112,389 B1 | 9/2006 | Arora et al. | |
| 7,892,673 B2 | 2/2011 | Hennige et al. | |
| 8,067,119 B2 | 11/2011 | Deguchi et al. | |
| 2001/0018150 A1 | 8/2001 | Morita et al. | |
| 2003/0138701 A1 * | 7/2003 | Tsukiashi et al. | 429/250 |
| 2003/0186129 A1 | 10/2003 | Trautmann et al. | |
| 2004/0038130 A1 | 2/2004 | Imachi et al. | |
| 2007/0254204 A1 | 11/2007 | Shin et al. | |
| 2008/0118827 A1 | 5/2008 | Call et al. | |
| 2010/0009249 A1 * | 1/2010 | Tojo et al. | 429/129 |
| 2010/0112432 A1 | 5/2010 | Nishida et al. | |
| 2010/0209783 A1 * | 8/2010 | Siret et al. | 429/338 |

(Continued)

FOREIGN PATENT DOCUMENTS

| | | | |
|---|---|---|---|
| JP | 11003694 A | * | 1/1999 |
| JP | 11219693 A | * | 8/1999 |

OTHER PUBLICATIONS

IPDL Machine Translation of the Detailed Description of JP 11-003694A (Jan. 1999).*

(Continued)

*Primary Examiner* — Gregg Cantelmo
(74) *Attorney, Agent, or Firm* — Damian Porcari; Brooks Kushman P.C.

(57) ABSTRACT

In at least one embodiment, a rechargeable battery is provided comprising an electrolyte including an organic solvent and a solution-treated polyolefin separator. A contact angle of the electrolyte including the organic solvent upon the separator may be from 0 to 15 degrees. In one embodiment, the solution-treated polyolefin layer has an increased concentration of ionic functional groups at its surface compared to an untreated polyolefin layer. In another embodiment, the solution-treated polyolefin separator has been treated with a treatment solution having a pH of either at most 2 or at least 12. The separator may be treated with an acid or base solution for at least 30 seconds. The solution-treated separator may exhibit improved wetting with an electrolyte compared to an untreated separator.

20 Claims, 3 Drawing Sheets

(56) References Cited

U.S. PATENT DOCUMENTS

2012/0034549 A1 2/2012 Kim et al.
2012/0070750 A1 3/2012 Blanc et al.

OTHER PUBLICATIONS

Cook et al., Secondary Batteries—Nickel Systems Alkaline Battery Separators, Encyclopedia of Electrochemical Power Sources, 2009, pp. 424-451, Freudenberg Dichtungs- und Schwingungstechnik GmbH & Co KG, Weinheim, Germany.

Xiaosong Huang, Development and characterization of a bilayer separator for lithium ion batteries, Science Direct Journal of Power Sources, 2011, pp. 8125-8128, Chemical Sciences & Materials Systems Lab, GM Global R&D, 30500 Mound Rd, Warren, MI 48090, USA.

Sheng Shui Zhang, A review on the separators of liquid electrolyte Li-ion batteries, Science Direct Journal of Power Sources 164, (2007) 351-364, Available online Nov. 22, 2006, U.S. Army Research Laboratory, AMSRD-SE-DC, Adelphi, MD 20783-1197, USA.

\* cited by examiner ered separators and an electrolyte according to an
TREATED BATTERY SEPARATOR

TECHNICAL FIELD

One or more embodiments relate to a treated separator and methods of producing the same.

BACKGROUND

Electric vehicles include vehicles having an electric motor for vehicle propulsion, such as battery electric vehicles (BEV), hybrid electric vehicles (HEV), and plug-in hybrid electric vehicles (PHEV). A BEV includes an electric motor, wherein the energy source for the motor is a battery that is re-chargeable from an external electric grid. A HEV includes an internal combustion engine and an electric motor, wherein the energy source for the engine is fuel and the energy source for the motor is a battery. A PHEV is like a HEV, but the PHEV has a larger capacity battery that is rechargeable from the external electric grid. Lithium-ion (Li-ion) batteries are used in BEV, HEV, and PHEV due to their high voltage, high specific energy, high energy density, low self-discharge rate, long cycle life and wide temperature operational range. A separator is generally placed between an anode and a cathode of the Li-ion battery. The separator prevents physical contact of the two electrodes (e.g., internal short circuits), while still allowing for rapid transportation of ionic charge carriers between the cathode and anode.

SUMMARY

In at least one embodiment, a rechargeable battery is provided comprising an electrolyte including an organic solvent and a solution-treated polyolefin separator. A contact angle of the electrolyte including the organic solvent upon the separator is 0 to 15 degrees. In one embodiment, the solution-treated polyolefin layer has an increased concentration of ionic functional groups at its surface compared to an untreated polyolefin layer. In another embodiment, the solution-treated polyolefin separator has been treated with a treatment solution having a pH of either at most 2 or at least 12.

The solution treatment may be an acid having a pH of at most 2 and selected from the group consisting of HCl, HI, HBr, $HClO_4$, $HClO_3$, $H_2SO_4$, and $HNO_3$. The solution treatment may also be a base having a pH of at least 12 and selected from the group consisting of NaOH, KOH, LiOH, RbOH, CsOH, $Ca(OH)_2$, $Ba(OH)_2$, and $Sr(OH)_2$.

In one embodiment, the solution treatment has a concentration of at least 30 percent by weight. In another embodiment, the contact angle between the separator and the electrolyte is 0 to 10 degrees. In another embodiment, the surface of the solution-treated polyolefin layer may be substantially completely wetted when in contact with the electrolyte.

In at least one embodiment, a method of treating a secondary battery separator is provided, comprising applying a solution having a pH of either at most 2 or at least 12 to a polyolefin separator, and maintaining the separator in the solution for at least 30 seconds at a temperature of 10 to 50° C. to obtain a solution-treated separator having a contact angle with an electrolyte including an organic solvent of 0 to 15 degrees.

The solution may be an acid having a pH of at most 2 and selected from the group consisting of HCl, HI, HBr, $HClO_4$, $HClO_3$, $H_2SO_4$, and $HNO_3$. The solution may also be a base having a pH of at least 12 and selected from the group consisting of NaOH, KOH, LiOH, RbOH, CsOH, $Ca(OH)_2$, $Ba(OH)_2$, and $Sr(OH)_2$. The solution treatment may have a concentration of at least 30 percent by weight.

In one embodiment, the separator is maintained in the solution for at least 20 minutes. In another embodiment, the separator is maintained in the solution for at least 1 hour. In one embodiment, the temperature of the solution may be 15 to 25° C. In another embodiment, 1 to 50 mg of separator are treated per ml of solution. In one embodiment, the separator is immersed in the solution during the at least 30 seconds that it is maintained in the solution.

In at least one embodiment, a lithium-ion battery is provided comprising a positive and negative electrode, an electrolyte including a lithium salt and an organic solvent, and a solution-treated polyolefin separator in direct contact with the positive and negative electrodes, a contact angle of the electrolyte including the organic solvent upon the separator being 0 to 15 degrees.

In one embodiment, the solution-treated polyolefin layer has an increased concentration of ionic functional groups at its surface compared to an untreated polyolefin layer. In another embodiment, the solution-treated polyolefin separator has been treated with a treatment solution having a pH of either at most 2 or at least 12.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ embodiments of the present invention.

Figure 1:
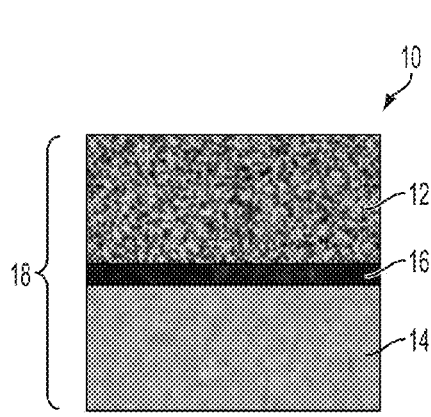
FIG. 1 is a schematic drawing of a lithium-ion battery.

With reference to FIG. 1, a secondary battery 10 is illustrated, for example, a lithium-ion (Li-ion) battery. The battery 10 has a negative electrode (anode) 12, a positive electrode (cathode) 14, and a separator 16 disposed between the anode 12 and cathode 14. The separator may be formed of any suitable material. In at least one embodiment, the separator 16 is a polyolefin, such as polyethylene or polypropylene. In one embodiment, the separator is a polyolefin separator that is in direct contact with the anode 12, cathode 14, or both (e.g., the polyolefin separator has no coating thereon). An electrolyte 18 may be disposed within the anode 12, cathode 14, and/or separator 16. In at least one embodiment, the electrolyte includes a lithium salt and an organic solvent. Examples of suitable lithium salts include, but are not limited to, $LiPF_6$, $LiBF_4$ and $LiClO_4$. The organic solvent may include ethylene carbonate (EC), dimethyl carbonate (DMC), and/or diethyl carbonate (DEC), and any combination thereof, as well as other suitable organic solvents. In at least one embodiment, the organic solvent is a combination of EC and DEC in a 3:7 ratio by volume (v/v). Other suitable electrolytes may include ionic liquid electrolytes and aqueous electrolytes.

Commonly used commercial separators may not provide ideal absorption of electrolytes. Less than ideal wettability of the separator by the electrolyte may lead to significant issues for the Li-ion battery, and its manufacture. Low wettability (e.g., high contact angles) of the separator by the electrolyte may create bottlenecks in the battery cell manufacturing process due to slow fill times. Slow fill times may increase overhead and may also require increased capital for equipment. Research has been done on finding alternative separator materials or placing ceramic coatings on the surface, but the results still have drawbacks. In at least one embodiment, the separator is wetted easily by an electrolyte. Increasing wettability may decrease ionic resistance, speed the electrolyte filling process and improve battery cycle life.

It has been found that by applying a solution treatment to the separator 16, the wettability of the separator 16 by the electrolyte 18 is increased. In at least one embodiment, the solution treatment is an acid treatment or a base treatment. The treatment solution may have a pH value of either at most 2 (acid) or at least 12 (base). In at least one embodiment, the solution treatment is an acid having a pH of at most 2 and includes a strong acid, for example, HCl, HI, HBr, $HClO_4$, $HClO_3$, $H_2SO_4$, and/or $HNO_3$. In some embodiments, the pH of the solution may be 1 or lower. However, other acids and higher pH values may also be used in some solution treatment embodiments.

In embodiments having an acid solution, the concentration of the solution may be high. Concentration may be measured in any suitable way, for example weight percent or molarity. In at least one embodiment, the solution is an acid having a concentration of at least 10 weight percent. In another embodiment, the solution is an acid having a concentration of at least 20 weight percent. In another embodiment, the solution is an acid having a concentration of at least 30 weight percent. In another embodiment, the solution is an acid having a concentration of at least 35 weight percent. In another embodiment, the solution is an acid having a concentration of at least 40 weight percent. In at least one embodiment, the solution is an acid having a concentration of at least 1 mole per liter (M). In another embodiment, the solution is an acid having a concentration of at least 5 M. In another embodiment, the solution is an acid having a concentration of at least 10 M. In another embodiment, the solution is an acid having a concentration of at least 15 M. In another embodiment, the solution is an acid having a concentration of at least 18 M. In one embodiment, the solution is an acid having a commercial concentration (e.g., for HCl about 36-38 weight percent or about 12 M).

In embodiments having a base solution, the concentration of the solution may be high. Concentration may be measured in any suitable way, for example weight percent or molarity. In at least one embodiment, the solution is a base having a concentration of at least 10 weight percent. In another embodiment, the solution is a base having a concentration of at least 20 weight percent. In another embodiment, the solution is a base having a concentration of at least 30 weight percent. In another embodiment, the solution is a base having a concentration of at least 35 weight percent. In another embodiment, the solution is a base having a concentration of at least 40 weight percent. In at least one embodiment, the solution is a base having a concentration of at least 1 mole per liter (M). In another embodiment, the solution is a base having a concentration of at least 5 M. In another embodiment, the solution is a base having a concentration of at least 10 M. In another embodiment, the solution is a base having a concentration of at least 15 M. In another embodiment, the solution is a base having a concentration of at least 18 M. In one embodiment, the solution is a base having a commercial concentration.

The solution may be applied to the separator 16 in any suitable way. In at least one embodiment, the separator 16 may be immersed in a bath of the solution in either a batch or continuous process. Another potential process may include spraying the solution onto the separator 16. To allow the solution to react with or otherwise affect the properties of the separator 16, the solution may be applied to and maintained in contact with the separator 16 for at least a certain treatment time. In one embodiment, the treatment time is at least 30 seconds. In another embodiment, the treatment time is at least 1 minute. In another embodiment, the treatment time is at least 5 minutes. In another embodiment, the treatment time is at least 10 minutes. In another embodiment, the treatment time is at least 20 minutes. In another embodiment, the treatment time is at least 30 minutes. In another embodiment, the treatment time is at least an hour. In another embodiment, the treatment time is at least 5 hours. In another embodiment, the treatment time is at least 12 hours. In another embodiment, the treatment time is at least 24 hours. In another embodiment, the treatment time is at least 2 days. In another embodiment, the treatment time is at least 4 days. In another embodiment, the treatment time is at least 7 days. In another embodiment, the treatment time is at least 2 weeks. In another embodiment, the treatment time is at least 1 month.

Stated another way, treatment times may be from about 30 seconds to 2 months or longer. In one embodiment, the treatment time is from 1 minute to 2 weeks. In another embodiment, the treatment time is from 1 minute to 7 days. In another embodiment, the treatment time is from 5 minutes to 4 days. In another embodiment, the treatment time is from 10 minutes to 2 days. In another embodiment, the treatment time is from 20 minutes to 1 day (24 hours). In another embodiment, the treatment time is from 20 minutes to 12 hours. In another embodiment, the treatment time is from 20 minutes to 5 hours. In another embodiment, the treatment time is from 20 minutes to 1 hour. In another embodiment, the treatment time is about 30 minutes.

Figure 2:
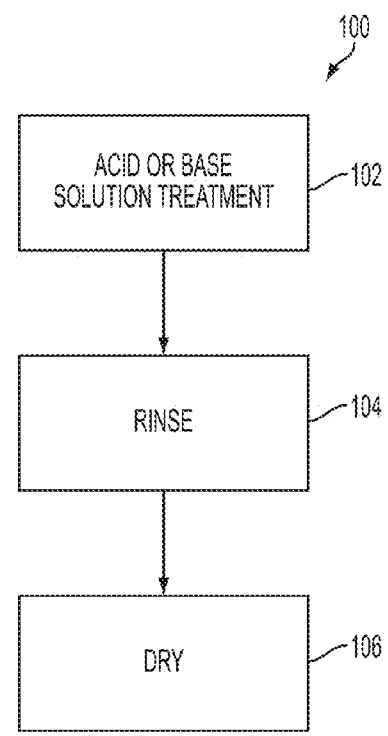
FIG. 2 is a flowchart of an embodiment of a process for treating a separator.

An embodiment of the solution treatment process 100 is illustrated in FIG. 2. In the immersion step 102, the separator 16 is immersed in either an acid or base solution for the predetermined treatment time (e.g., 30 minutes). The immersion may be by batch or it may be a continuous process. In the rinsing step 104, the separator 16 is rinsed to remove excess solution. The rinsing may be done by immersion in water, similar to step 102, by spraying, or by any other suitable method. The water may be a highly purified water, such as deionized or reverse-osmosis water, or it may be a less purified (or unpurified) water. In the drying step 106, the separator 16 is dried to remove water remaining following the rinsing step 104.

The acid or base solution may be provided in an amount to substantially cover the separator 16. The solution may also be provided in an amount sufficient to cover the separator 16 and to penetrate substantially all of the pores present therein. Alternatively, the amount of solution applied may be determined on a mass of separator per volume of solution concentration basis, for example mg of separator per ml of solution. In at least one embodiment, the concentration is 0.1 to 100 mg per ml. In another embodiment, the concentration is 1 to 50 mg per ml. In another embodiment, the concentration is 1 to 25 mg per ml. In another embodiment, the concentration is 1 to 10 mg per ml.

The solution treatment may be carried out at relatively low temperatures (e.g., no heat source required). For example, the treatment may be carried out at a temperature of 10 to 50° C. In other embodiments, the temperature may be 15 to 35° C. In other embodiments, the temperature may be 15 to 25° C. In at least one embodiment, the treatment may be done at room temperature (e.g., about 20° C.).

Without being held to any particular theory, it is believed that the acid or base solution treatments described in the above embodiments increase the concentration and/or content of ionic functional groups at the surfaces of the separator 16 compared to untreated separators. The increase in ionic functional groups may increase the polar-polar attractions between the separator 16 and the electrolyte 18, which improves wettability (e.g., reduced contact angles). Highly polar oxygen-containing groups may be one type of ionic functional group whose content at the surface is increased, for example, carbonyl groups. The increase in oxygen-containing ionic functional groups at the surface of the separator 16 may be quantified using X-ray photoelectron spectroscopy (XPS) analysis to measure the increase in oxygen content after the solution treatment. However, any suitable method of surface composition analysis may be used. In at least one embodiment, the oxygen content may be at least 200% of the untreated amount following treatment. In another embodiment, the oxygen content may be at least 300% of the untreated amount following treatment. In another embodiment, the oxygen content may be at least 400% of the untreated amount following treatment. In another embodiment, the oxygen content may be at least 500% of the untreated amount following treatment. In another embodiment, the oxygen content may be at least 750% of the untreated amount following treatment. In another embodiment, the oxygen content may be at least 1000% of the untreated amount following treatment. In another embodiment, the oxygen content may be at least 1500% of the untreated amount following treatment.

In at least one embodiment, the contact angle between the separator 16 and the electrolyte 18 is from 0 to 15 degrees following the solution treatment. Contact angle may be measured in any suitable way, for example using a contact angle goniometer. The contact angle may be measured initially and/or after up to several minutes after the electrolyte is applied to the separator. In another embodiment, the contact angle is from 0 to 10 degrees. In another embodiment, the contact angle is from 0 to 5 degrees. In another embodiment, the electrolyte 18 substantially completely wets the separator 16 when they are in contact, such that the contact angle is about zero.

EXAMPLE 1

Figure 3:
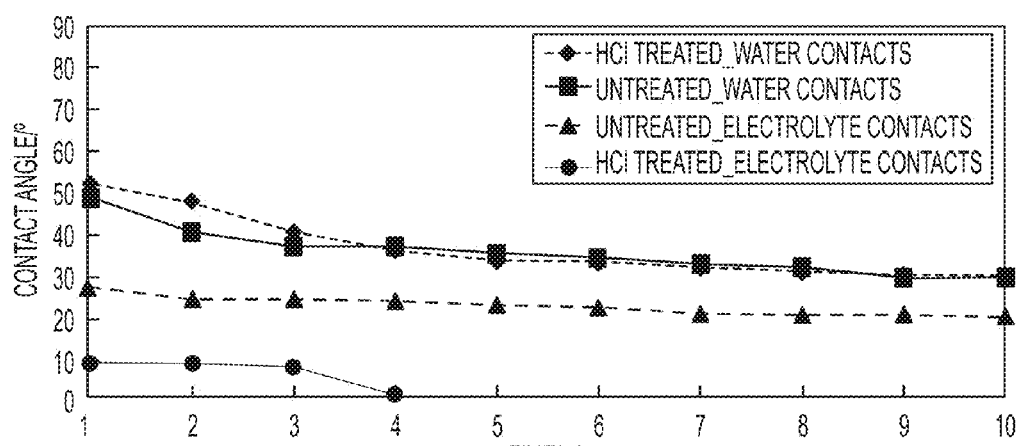
FIG. 3 is a graph of contact angle between acid-treated and untreated separators and an electrolyte according to an embodiment.
Figures 4A, 4B:
FIG. 4A is a side view showing the wetting of the untreated separator and the electrolyte of FIG. 3.
FIG. 4B is a side view showing the wetting of the treated separator and the electrolyte of FIG. 3.

A commercially available lithium-ion battery grade polyethylene separator was immersed in 50 ml of commercial concentration of HCl (typically 36-38 wt %) for 7 days at room temperature. After the treatment was finished, the treated separator was rinsed with deionized (DI) water and dried. Ten μl of 1.0M LiPF6 with EC/DEC (3:7 v/v) was then applied to the surface of the treated separator. The contact angle of the treated separator and an untreated separator were measured using a FTA 200 Goniometer over the course of 10 minutes. For comparison, the contact angle with (DI) water was measured for a similarly treated separator and an untreated separator. The results are shown in FIG. 3, which shows that the treated separator had significantly better wetting than the untreated separator when the electrolyte was applied. The treated separator had an initial contact angle of 8.3°, and after 4 minutes the contact angle was substantially zero. In contrast, the untreated separator had an initial contact angle of 26.3° and after 10 minutes the contact angle was leveling off at 17.5°. FIGS. 4A and 4B show the untreated and treated separators, respectively. The control samples tested with DI water showed very similar results to one another, as shown in FIG. 3.

EXAMPLE 2

Figure 5:
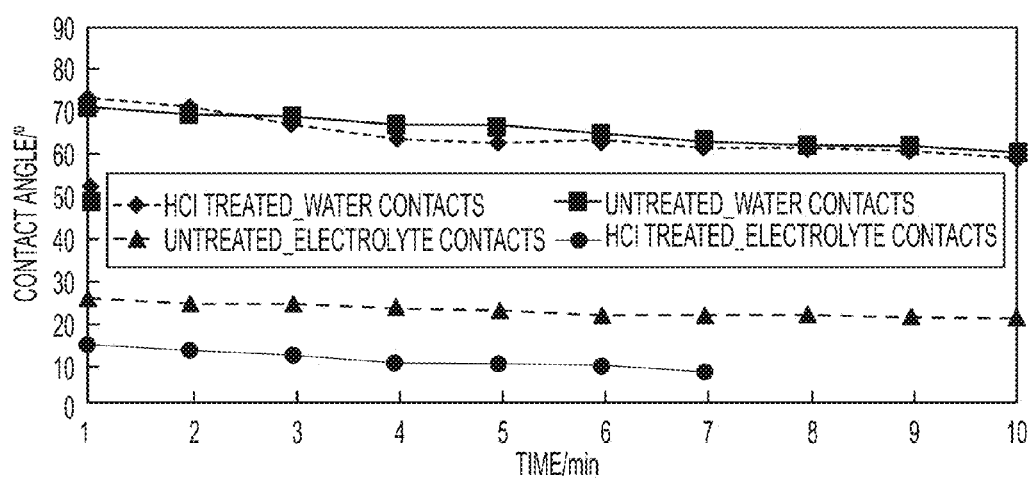
FIG. 5 is a graph of contact angle between acid-treated and untreated separators and an electrolyte according to another embodiment.

A commercially available lithium-ion battery grade polypropylene separator was immersed in 50 ml of commercial concentration of HCl (typically 36-38 wt %) for 4 days at room temperature. After the treatment was finished, the treated separator was rinsed with deionized (DI) water and dried. Ten μl of 1.0M LiPF6 with EC/DEC (3:7 v/v) was then applied to the surface of the treated separator. The contact angle of the treated separator and an untreated separator were measured using a FTA 200 Goniometer over the course of 10 minutes. For comparison, the contact angle with (DI) water was measured for a similarly treated separator and an untreated separator. The results are shown in FIG. 5, which shows that the treated separator had significantly better wetting than the untreated separator when the electrolyte was applied. The treated separator had an initial contact angle of 13.9°, and after 7 minutes the contact angle was 6.4°. In contrast, the untreated separator had an initial contact angle of 25.2° and after 10 minutes the contact angle was leveling off at 18.7°. The control samples tested with DI water showed very similar results to one another, as shown in FIG. 5.

EXAMPLE 3

Figure 6:
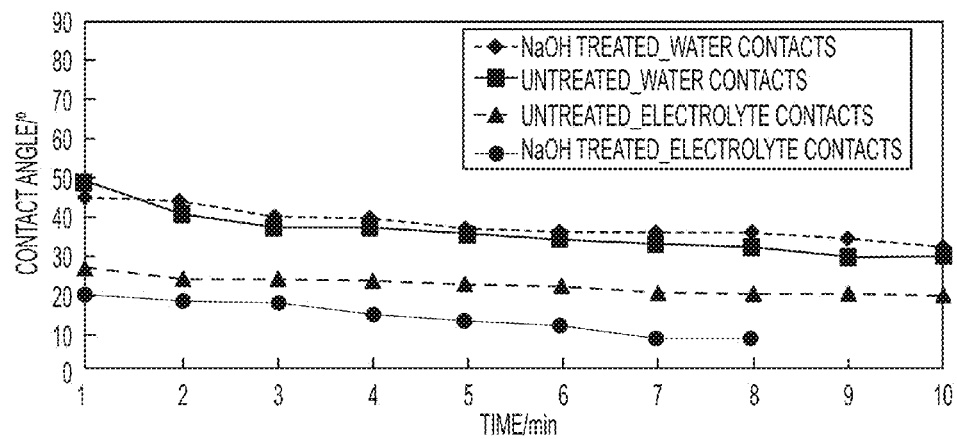
FIG. 6 is a graph of contact angle between base-treated and untreated separators and an electrolyte according to an embodiment.

A commercially available lithium-ion battery grade polyethylene separator was immersed in 50 ml of NaOH (18 mol/L) for 7 days at room temperature. After the treatment was finished, the treated separator was rinsed with deionized (DI) water and dried. Ten μA of 1.0M LiPF6 with EC/DEC (3:7 v/v) was then applied to the surface of the treated separator. The contact angle of the treated separator and an untreated separator were measured using a FTA 200 Goniometer over the course of 10 minutes. For comparison, the contact angle with (DI) water was measured for a similarly treated separator and an untreated separator. The results are shown in FIG. 6, which shows that the treated separator had significantly better wetting than the untreated separator when the electrolyte was applied. The treated separator had an initial contact angle of 20.9°, and after 8 minutes the contact angle was 7.8°. In contrast, the untreated separator had an initial contact angle of 26.3° and after 10 minutes the contact angle was leveling off at 17.5°. The control samples tested with DI water showed very similar results to one another, as shown in FIG. 6.

EXAMPLE 4

Figure 7:
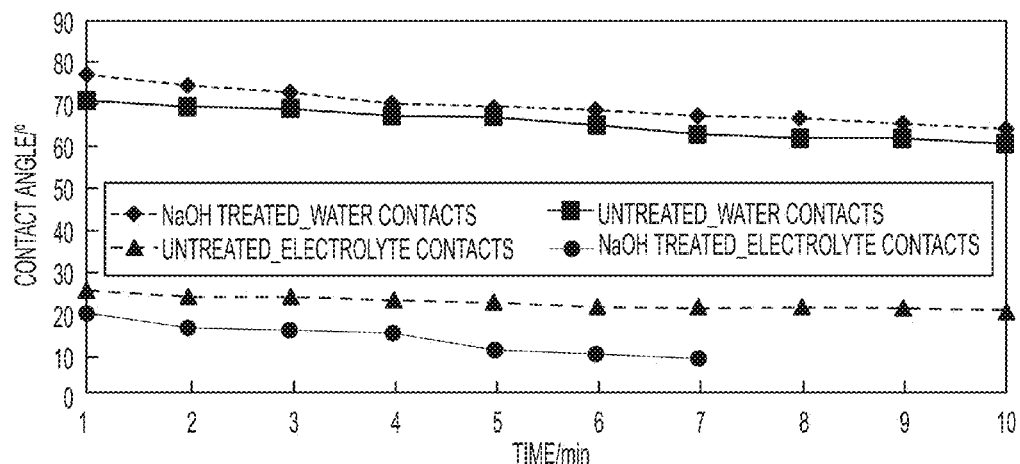
FIG. 7 is a graph of contact angle between base-treated and untreated separators and an electrolyte according to another embodiment.

A commercially available lithium-ion battery grade polypropylene separator was immersed in NaOH (18 mol/L)

for 4 days at room temperature. After the treatment was finished, the treated separator was rinsed with deionized (DI) water and dried. Ten μA of 1.0M LiPF6 with EC/DEC (3:7 v/v) was then applied to the surface of the treated separator. The contact angle of the treated separator and an untreated separator were measured using a FTA 200 Goniometer over the course of 10 minutes. For comparison, the contact angle with (DI) water was measured for a similarly treated separator and an untreated separator. The results are shown in FIG. 7, which shows that the treated separator had significantly better wetting than the untreated separator when the electrolyte was applied. The treated separator had an initial contact angle of 19.7°, and after 7 minutes the contact angle was 7.3°. In contrast, the untreated separator had an initial contact angle of 25.2° and after 10 minutes the contact angle was leveling off at 18.7°. The control samples tested with DI water showed very similar results to one another, as shown in FIG. 7.

EXAMPLE 5

Two lithium-ion battery grade polyethylene separators were treated with a commercially available concentrated HCl for 7 days and then compared to control samples using XPS analysis of the surface composition. The results are shown in Table 1, below. Both acid-treated samples showed an increase in oxygen content of about 500%.

TABLE 1

Results of XPS surface analysis of untreated and acid-treated PE separators.

| Sample (PE Separator) | C (atomic %) | O (atomic %) |
|---|---|---|
| Control | | |
| 1 | 99.5 | 0.5 |
| 2 | 99.5 | 0.5 |
| HCl Treated | | |
| 1 | 97.9 | 2.2 |
| 2 | 97.4 | 2.6 |

EXAMPLE 6

A lithium-ion battery grade polypropylene separator was treated with a commercially available concentrated HCl for 7 days and then compared to control samples using XPS analysis of the surface composition. The results are shown in Table 2, below. The acid-treated sample showed an increase in oxygen content of about 1000%.

TABLE 2

Results of XPS surface analysis of untreated and acid-treated PP separators.

| Sample (PP Separator) | C (atomic %) | O (atomic %) |
|---|---|---|
| Control | 99.4 | 0.6 |
| HCl Treated | 94.0 | 6.0 |

While certain embodiments have been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications. Additionally, the features of various implementing embodiments may be combined to form further embodiments of the invention.

What is claimed is:

1. A method of manufacturing a lithium-ion battery comprising:
    immersing a polyolefin separator in a solution having a pH of either at most 2 or at least 12 for at least 5 minutes at a temperature of 10-50° C. to obtain a solution-treated separator having a contact angle with an electrolyte including an organic solvent of 0-15 degrees; and
    incorporating the solution-treated separator into a lithium-ion battery including an electrolyte including an organic solvent.

2. The method of claim 1, wherein the solution is an acid selected from the group consisting of HCl, HI, HBr, HClO$_4$, HClO$_3$, H$_2$SO$_4$, and HNO$_3$.

3. The method of claim 1, wherein the solution is a base selected from the group consisting of NaOH, KOH, LiOH, RbOH, CsOH, Ca(OH)$_2$, Ba(OH)$_2$, and Sr(OH)$_2$.

4. The method of claim 1, wherein the solution has a concentration of at least 30 percent by weight.

5. The method of claim 1, wherein the separator is maintained in the solution for at least 20 minutes.

6. The method of claim 1, wherein the temperature of the solution is 15 to 25° C.

7. The method of claim 1, wherein 1 mg to 50 mg of separator are treated per ml of solution.

8. The method of claim 1, wherein the polyolefin separator is immersed in the solution to obtain a solution-treated separator having a contact angle with the electrolyte including the organic solvent of 0-10 degrees.

9. The method of claim 1, wherein the polyolefin separator is immersed in the solution to obtain a solution-treated separator having a contact angle with the electrolyte including the organic solvent of 0-5 degrees.

10. The method of claim 1, wherein the solution is an acid having a pH of 1 or lower.

11. The method of claim 1, wherein the separator is maintained in the solution for at least 24 hours.

12. A method of manufacturing a lithium-ion battery comprising:
    applying a solution having a pH of at most 2 or at least 12 to a polyolefin separator;
    maintaining the separator in the solution for at least 30 seconds to obtain a solution-treated separator having an increased concentration of oxygen-containing ionic functional groups at its surface compared to an untreated polyolefin separator and a contact angle with an electrolyte including an organic solvent of 0 to 15 degrees; and
    incorporating the solution-treated separator into a lithium-ion battery including an electrolyte including an organic solvent.

13. The method of claim 12, wherein the solution is an acid selected from the group consisting of HCl, HI, HBr, $HClO_4$, $HClO_3$, $H_2SO_4$, and $HNO_3$.

14. The method of claim 12, wherein the solution is a base selected from the group consisting of NaOH, KOH, LiOH, RbOH, CsOH, $Ca(OH)_2$, $Ba(OH)_2$, and $Sr(OH)_2$.

15. The method of claim 12, wherein the separator is maintained in the solution for at least 1 hour.

16. The method of claim 12, wherein applying the solution to the polyolefin separator includes spraying the solution onto the separator.

17. The method of claim 12, wherein the solution is an acid having a pH of 1 or lower.

18. The method of claim 12, wherein the polyolefin separator is immersed in the solution to obtain a solution-treated separator having a contact angle with the electrolyte including the organic solvent of 0-10 degrees.

19. The method of claim 12, wherein the polyolefin separator is immersed in the solution to obtain a solution-treated separator having a contact angle with the electrolyte including the organic solvent of 0-5 degrees.

20. The method of claim 12, wherein 1 mg to 10 mg of separator are treated per ml of solution.

* * * * *